United States Patent
Ros

(10) Patent No.: US 12,297,033 B2
(45) Date of Patent: May 13, 2025

(54) PACKAGING FOR PHARMACEUTICAL PRODUCTS

(71) Applicant: REP IP AG, Zug (CH)

(72) Inventor: Nico Ros, Riehen (CH)

(73) Assignee: REP IP AG, Zug (CH)

(\*) Notice: Subject to any disclaimer, the term of this patent is extended or adjusted under 35 U.S.C. 154(b) by 465 days.

(21) Appl. No.: 17/620,369

(22) PCT Filed: Jun. 23, 2020

(86) PCT No.: PCT/IB2020/055902
§ 371 (c)(1),
(2) Date: Dec. 17, 2021

(87) PCT Pub. No.: WO2020/261104
PCT Pub. Date: Dec. 30, 2020

(65) Prior Publication Data
US 2022/0242651 A1    Aug. 4, 2022

(30) Foreign Application Priority Data
Jun. 24, 2019 (AT) .................. A 231/2019

(51) Int. Cl.
*B65D 81/38* (2006.01)
*A61J 1/03* (2023.01)
*A61J 1/06* (2006.01)

(52) U.S. Cl.
CPC .......... *B65D 81/3825* (2013.01); *A61J 1/035* (2013.01); *A61J 1/06* (2013.01); *B65D 81/3813* (2013.01);
(Continued)

(58) Field of Classification Search
CPC ............... B65D 81/38; B65D 81/3813; B65D 81/3818; B65D 81/3825; A61J 1/00;
(Continued)

(56) References Cited

U.S. PATENT DOCUMENTS

| | | | | |
|---|---|---|---|---|
| 662,541 A | * | 11/1900 | Miskolczy | ................ F25D 3/02 D15/89 |
| 3,802,220 A | * | 4/1974 | Pompo | ..................... F25D 3/00 62/457.2 |

(Continued)

FOREIGN PATENT DOCUMENTS

| | | | |
|---|---|---|---|
| CA | 2278748 A1 | * 7/1998 | |
| DE | 19813562 A1 | * 11/1998 | ............. C09K 5/063 |

(Continued)

OTHER PUBLICATIONS

International Search Report dated Aug. 20, 2020 issued in corresponding International Application No. PCT/IB2020/055902, with English translation (5 pgs.).

(Continued)

*Primary Examiner* — Chun Hoi Cheung
*Assistant Examiner* — Brijesh V. Patel
(74) *Attorney, Agent, or Firm* — Pillsbury Winthrop Shaw Pittman, LLP

(57) ABSTRACT

In a packaging for pharmaceutical products, comprising a primary packaging for receiving a dose or several doses of a pharmaceutical product, and a secondary packaging designed as a cardboard box, in which the primary packaging is received, the primary packaging is arranged in an insulation shell having a latent heat storage material and the insulation shell is held in the secondary packaging at a distance on all sides to form an insulation gap.

21 Claims, 1 Drawing Sheet

(52) U.S. Cl.
CPC ........ *A61J 2200/50* (2013.01); *A61J 2200/72* (2013.01)

(58) Field of Classification Search
CPC ......... A61J 1/035; A61J 1/06; A61J 2200/50; A61J 2200/72
USPC .......... 220/592.01–592.28; 62/430, 4, 457.9, 62/457.1, 530, 372, 371, 457.2, 529, 60, 62/78, 337, 463
See application file for complete search history.

(56) References Cited

U.S. PATENT DOCUMENTS

| | | | | |
|---|---|---|---|---|
| 4,145,895 A * | 3/1979 | Hjertstrand | ............... | F25D 3/00 165/47 |
| 4,267,927 A * | 5/1981 | English, Jr. | .......... | B65D 81/113 264/45.3 |
| 4,292,817 A * | 10/1981 | Loucks | ............... | B65D 81/3862 62/530 |
| 4,455,842 A * | 6/1984 | Granlund | ................ | A01N 1/02 62/78 |
| 4,530,816 A * | 7/1985 | Douglas-Hamilton | ... | F25D 3/08 422/1 |
| 4,573,581 A * | 3/1986 | Galloway | ............... | A61J 1/165 220/592.21 |
| 4,619,678 A * | 10/1986 | Rubin | ....................... | F25D 5/02 62/457.2 |
| 4,723,974 A * | 2/1988 | Ammerman | ......... | A01N 1/0273 62/530 |
| 4,947,658 A * | 8/1990 | Wheeler | .................... | F25D 3/06 62/457.2 |
| 4,955,480 A * | 9/1990 | Sexton | ..................... | F25D 3/08 62/372 |
| 5,040,678 A * | 8/1991 | Lenmark, Sr. | ....... | B65D 81/107 206/443 |
| 5,105,627 A * | 4/1992 | Kurita | ...................... | A01N 1/02 62/457.2 |
| 5,181,394 A * | 1/1993 | Schea, III | ................ | F25D 3/08 D24/227 |
| 5,236,088 A * | 8/1993 | Dhority | .............. | B65D 81/3858 206/524.4 |
| 5,314,087 A * | 5/1994 | Shea | .................. | B65D 81/3853 220/592.21 |
| 5,415,282 A * | 5/1995 | Kienholz | ........... | A61B 10/0096 206/524.4 |
| 5,417,082 A * | 5/1995 | Foster | .................... | B65D 81/18 165/96 |
| 5,419,152 A * | 5/1995 | Silber | ................ | B65D 81/3858 62/457.2 |
| 5,924,302 A * | 7/1999 | Derifield | ........... | B65D 81/3862 62/457.2 |
| 5,956,968 A * | 9/1999 | Grabowski | ............... | F25D 3/08 62/457.2 |
| 6,123,218 A * | 9/2000 | Fujii | ....................... | F16L 59/08 220/592.21 |
| 6,443,309 B1 * | 9/2002 | Becker | .................... | B65D 5/60 220/592.2 |
| 6,935,133 B2 * | 8/2005 | Keeter | .................. | A61M 5/003 62/457.2 |
| 7,621,404 B2 * | 11/2009 | Murray | ................. | B65B 25/001 383/110 |
| 7,624,873 B2 * | 12/2009 | Tennant | ............. | A61B 10/0096 206/524.8 |
| 8,474,228 B2 * | 7/2013 | Adair | .................. | B65D 81/025 53/158 |
| 8,544,648 B2 * | 10/2013 | Cleveland | .............. | B65D 45/22 220/592.2 |
| 9,371,169 B1 * | 6/2016 | Petrucci | .............. | B65D 81/3862 |
| 10,897,892 B1 * | 1/2021 | Sole | ...................... | A01N 1/0268 |
| 10,988,302 B1 * | 4/2021 | Madigan | ................ | B65D 11/10 |
| 2003/0012701 A1 * | 1/2003 | Sangha | ............ | A61B 5/150305 62/457.2 |
| 2006/0191282 A1 * | 8/2006 | Sekiya | ............... | B65D 81/3823 62/457.2 |
| 2007/0267420 A1 * | 11/2007 | Brockel | ................. | A45C 11/20 220/592.2 |
| 2009/0145911 A1 * | 6/2009 | Hyde | ................. | B65D 81/3811 220/592.21 |
| 2011/0192852 A1 * | 8/2011 | Chebli | ................. | B65D 5/6664 220/592.21 |
| 2012/0285972 A1 * | 11/2012 | Fu | ...................... | B65D 81/3869 220/592.2 |
| 2013/0015192 A1 * | 1/2013 | Seagle | ................... | B65D 19/18 220/592.01 |
| 2013/0213977 A1 * | 8/2013 | Stathes | .............. | B65D 81/3848 428/69 |
| 2014/0190976 A1 * | 7/2014 | Imbrecht | ................ | B65D 88/74 220/592.01 |
| 2015/0158656 A1 * | 6/2015 | McKinnon | ............ | B31B 50/142 220/592.2 |
| 2015/0239640 A1 * | 8/2015 | Smith | .................. | B65D 43/162 220/592.2 |
| 2016/0023833 A1 * | 1/2016 | Hallab | ................. | B65D 81/022 220/592.27 |
| 2016/0228328 A1 | 8/2016 | Wengreen et al. | | |
| 2019/0077576 A1 | 3/2019 | Miller et al. | | |

FOREIGN PATENT DOCUMENTS

| | | | | |
|---|---|---|---|---|
| DE | 10030102 A1 | | 1/2002 | |
| DE | 202007013140 U1 | * | 3/2009 | ............. C09K 5/063 |
| EP | 0157751 A2 | | 10/1985 | |
| EP | 1845032 B1 | | 5/2009 | |
| EP | 2700891 A2 | | 2/2014 | |
| EP | 3147598 A1 | | 3/2017 | |
| JP | 2005280728 A | * | 10/2005 | |
| JP | 4176419 B2 | * | 11/2008 | |
| JP | 2009019857 A | * | 1/2009 | ........... F28D 20/023 |
| KR | 20210153818 A | * | 12/2021 | |
| WO | WO-0011424 A1 | * | 3/2000 | ............. A47J 36/30 |
| WO | 00/55050 A2 | | 9/2000 | |
| WO | 03/101861 A2 | | 12/2003 | |
| WO | WO-2012147676 A1 | * | 11/2012 | ............. C09K 5/063 |
| WO | WO-2017033330 A1 | * | 3/2017 | ........... B65D 5/5004 |
| WO | 2017/072638 A1 | | 5/2017 | |
| WO | 2018/197049 A1 | | 11/2018 | |

OTHER PUBLICATIONS

Written Opinion of the International Searching Authority dated Aug. 20, 2020, issued in corresponding International Application No. PCT/IB2020/055902 (7 pgs.).

International Search Report dated Aug. 20, 2020, issued in International Application No. PCT/IB2020/055907, with English translation (6 pgs.).

Written Opinion of the International Searching Authority dated Aug. 20, 2020, issued in International Application No. PCT/IB2020/055907 (7 pgs.).

Office Action dated Oct. 10, 2024, issued in corresponding European Patent Application No. EP 20 743 327.7 (8 pgs.).

* cited by examiner

PACKAGING FOR PHARMACEUTICAL PRODUCTS

CROSS-REFERENCE TO RELATED APPLICATIONS

This application is a national stage entry of PCT/IB2020/055902, filed Jun. 23, 2020, which claims priority to Austrian Application No. A 231/2019, filed Jun. 24, 2019, the contents of each of which are herein incorporated by reference in their entireties.

The invention relates to a packaging for pharmaceutical products, comprising a primary packaging for receiving one dose or several doses of a pharmaceutical product, and a secondary packaging designed as a cardboard box, in which the primary packaging is received.

Ready-to-use pharmaceutical products are usually first packed or filled in blisters, vials, syringes or injectors. The pharmaceutical products provided with primary packaging in this way are then in many cases packed in small cardboard boxes which serve as secondary packaging and on which the information required for marketing is printed.

A large number of such products, which are secondary-packaged by the manufacturer, are combined into larger units for transport and these units are provided with transport or freight packaging. In the case of temperature-sensitive pharmaceutical products, the transport or freight packaging can be provided with temperature-stabilizing properties, with temperature control modules made of a phase change material, for example, being inserted into the transport or freight packaging and the transport or freight packaging being provided with a thermal insulation layer. The transport or freight packaging can contain temperature sensors with which compliance with a predetermined temperature window can be checked. The transport or freight packaging can also be designed to protect the secondary packaged products from mechanical impact.

When transporting pharmaceuticals over periods of several hours or days, specified temperature ranges must be adhered to during storage and transport in order to ensure the usability and safety of the transported goods. For various drugs, temperature ranges from 2 to 25° C., in particular 2 to 8° C. or 15 to 25° C., are specified as storage and transport conditions.

The problem here is that the pharmaceutical products can only be stored and transported in a temperature-controlled manner if they are in the transport or freight packaging, for example in a temperature-controlled freight container. It can therefore not be determined whether a secondarily packaged pharmaceutical product was outside the specified temperature window before it was placed in the transport or freight packaging or after it was removed from the transport or freight packaging. For example, in the case of a temperature-sensitive pharmaceutical product purchased in a pharmacy, an end user cannot determine whether the product has become too warm or too cold when being transported home from the pharmacy. Neither can it be determined in the course of storage in the secondary packaging at the end user's home, or in a hospital or pharmacy, whether the product has become too warm or too cold.

Another disadvantage of conventional packaging systems that can be mentioned is that it is not possible to determine with certainty whether the secondary packaging has been opened and the pharmaceutical product has been replaced by a counterfeit.

Furthermore, it is not possible to trace the path of the individual secondary packaged products. If the usual logistics systems are appropriately equipped, this is only possible with the shipping unit having the transport or freight packaging, for example transport pallet, but this does not allow any differentiation with regard to each individual secondary packaging.

It follows from the problems outlined above that the end user cannot be sure whether he has taken a medically or pharmaceutically functional drug or whether the effectiveness has already been impaired due to the effects of temperature. Furthermore, the consumer cannot ensure whether he has actually taken the original drug or a fake.

Due to these uncertainties, it is not permitted in most countries to send medication from the manufacturer or an intermediary directly to the end user, as the end user is unable to check the authenticity and functionality of the medication.

The invention therefore aims to develop packaging for pharmaceutical products of the type mentioned at the outset in such a way that the effectiveness of temperature-sensitive pharmaceutical products is ensured for the end user and compliance with a prescribed temperature window can be checked over the entire transport chain to the end user. The invention also aims to make counterfeits of pharmaceutical products of any kind identifiable.

To achieve these objects, the invention essentially consists in a packaging of the type mentioned at the outset in that the primary packaging is arranged in an insulation shell having a latent heat storage material and that the insulation shell is held in the secondary packaging at a distance from the secondary packaging on all sides to form an insulation gap.

The invention is based on the idea of arranging the temperature-stabilizing elements inside a secondary packaging so that compliance with the prescribed temperature window does not depend on the temporary transport or freight packaging, such as a refrigerated freight container, a refrigerated transport vehicle or the like.

The secondary packaging is that cardboard packaging which is intended for handling by the end user and which contains the primary packaging for receiving one dose or several doses of the pharmaceutical product. The secondary packaging is used to sell the contained product, which is why it is also referred to as sales packaging. It can be designed for advertising purposes in order to encourage the end customer to purchase the respective content. Compared to the primary packaging such as glass bottles or blisters, the secondary packaging has no direct contact with the actual product. Nevertheless, the process steps in the production of the secondary packaging are usually subject to GMP (Good Manufacturing Practice) or FDA compliance. Furthermore, in accordance with the relevant pharmaceutical regulations, the secondary packaging must provide consumers with initial information such as the name of the pharmaceutical product, the active ingredient, the dosage form, the strength of the dosage form, the batch number, the expiry date and the like.

The cardboard box forming the secondary packaging is preferably designed as a folding box. The cardboard box, in particular cardboard folding box, is preferably constructed from single or multi-layer cardboard and has a wall thickness of a maximum of 1 mm, preferably a maximum of 0.5 mm.

The primary packaging is preferably designed as a blister pack, ampoule, injection ampoule or vial.

When equipping the secondary packaging with the temperature stabilization function, the challenge lies in the very limited space available and the high cost pressure, as each individual packaging must be equipped with the technology. The invention retains the conventional concept of a cardboard box as secondary packaging and integrates a temperature stabilization element in the form of a latent heat storage material that surrounds the inner packaging as an insulation shell.

It is preferably provided within the scope of the invention that the temperature stabilization function is implemented by elements that are located within the secondary packaging, so that the external appearance of the secondary packaging remains unchanged.

Latent heat storage materials belong to the group of passive temperature control elements, which are characterized by the fact that they do not require an external energy supply during use, but instead use their heat storage capacity, whereby depending on the temperature level, heat is released or absorbed to or from the primary packaging including the pharmaceutical product to be temperature-controlled. Such passive temperature control elements are exhausted as soon as the temperature equalization with the primary packaging or with its interior is complete. Latent heat accumulators are a special form of passive temperature control elements that can store thermal energy in phase change materials whose latent heat of fusion, heat of solution or heat of absorption is significantly greater than the heat that they can store due to their normal specific heat capacity.

A particularly efficient temperature stabilization is preferably achieved in that the insulation shell surrounds the primary packaging on all sides.

As an additional barrier against changes in temperature of the pharmaceutical product, the invention provides that the insulation shell comprising the latent heat storage material is held in the secondary packaging at a distance from the secondary packaging on all sides in order to form an insulation gap. The insulation gap is preferably filled with air, so that the heat transfer between the primary packaging and the secondary packaging is considerably reduced at low cost.

The latent heat storage material preferably contains or is formed by a phase change material. Phase change materials have a latent heat of fusion that is significantly greater than the heat that they can store due to their normal specific heat capacity. Phase change materials therefore lose their effect as soon as all of the material has completely passed through the phase change. However, by executing the opposite phase change, the latent heat storage can be recharged.

Depending on the type of pharmaceutical product, it must be kept in a temperature range from 2 to 20° C., e.g. in a temperature range from 2 to 8° C. or in a temperature range from 15° C. to 25° C. The phase change material has a phase transition temperature that is matched to the prescribed temperature range.

The phase change material preferably has a phase transition temperature of 3-10° C., in particular approx. 5° C.

The phase change material is preferably selected from the group consisting of paraffin, for example n-tetradecane or n-hexadecane, esters, for example methyl esters, linear alcohols, ethers, organic anhydrides, salt hydrates, water-salt mixtures, salt solutions and/or water-based solutions, or mixtures thereof.

Conventional phase change materials undergo a phase change from the solid state to the liquid state and vice versa. The phase change material must therefore be arranged in a suitable container so that it also remains in its intended location in the liquid state. In this context, a preferred embodiment of the invention provides that the phase change material is present in a dimensionally stable enclosure, in particular a plastic enclosure. The dimensionally stable enclosure, including its contents, preferably forms the insulation shell and therefore completely surrounds the primary packaging.

The arrangement of the phase change material in a suitably suitable enclosure is, however, associated with a high level of effort and also entails the risk that the phase change material diffuses through the enclosure or emerges from the enclosure due to a leak and contaminates the primary packaging. Furthermore, one is restricted in the shape of the enclosure, which in turn makes it difficult to handle when arranging the insulation shell in the secondary packaging and requires more space and weight.

In order to avoid these disadvantages, a preferred development of the invention provides that the latent heat storage material comprises a carrier material which is dimensionally stable at the use temperature, in which the phase change material is distributed or arranged so that the latent heat storage material is dimensionally stable in a temperature range both below and above the melting point of the phase change material. The use temperature is understood here to be the temperature at which an end user applies, transports or stores the pharmaceutical product. The use temperature therefore preferably covers a temperature range from −25° C. to +60° C. Thereby the problems with the handling of the phase change material can be avoided. In particular, it is not necessary to arrange latent heat accumulators of this type in separate containers.

The carrier material forms a matrix in which the phase change material is distributed. The matrix consisting of the carrier material gives the latent heat storage device the required mechanical stability at the use temperature and does not itself show any phase change within the use temperature.

In addition to the phase change material, the latent heat storage element preferably comprises one or more copolymers, in particular styrene block copolymers, and/or ethylene-butylene copolymers, as a carrier material, in order to ensure the dimensional stability of the latent heat storage element above the melting point of the phase change material.

Nanoporous carbon, into which the phase change material is incorporated, can also be used as the carrier material. Furthermore, small-pore lattice structures made of a polymer or open-pore foams, such as synthetic resin foams based on crude oil or the like, can be used as the carrier material.

It is preferably provided that the latent heat storage material is dimensionally stable up to a temperature of 10° C., preferably 20° C., particularly preferably 40° C. above the phase transition temperature of the phase change material. This ensures that the latent heat storage element continues to be dimensionally stable even at higher temperatures.

It can preferably be provided that the latent heat storage material, with a corresponding configuration of the carrier material, can be converted into the molten state when heated to a temperature well above the use temperature. The transition to the molten state can in particular take place from a temperature which is at least 60-100° C. above the use temperature or room temperature (20° C.). This enables the insulation shell to be produced by means of a forming process, in particular a casting process.

A preferred embodiment provides that the insulation shell is produced by injection molding the latent heat storage material. Injection molding processes have been known for a long time and can therefore be used easily and safely. In particular, injection molding processes can also be used to produce complex shapes in a simple and cost-effective manner.

According to a preferred embodiment, the insulation shell is adapted to the shape of the primary packaging and lies preferably flat, in particular on all sides, on the primary packaging. This allows a particularly efficient temperature stabilization of the primarily packaged product. The planar contact of the insulation shell with the primary packaging also includes embodiments in which a separating layer, for example in the form of a plastic film, is arranged between the shape-adapted insulation shell and the primary packaging. The shape-adapted design of the insulation shell is achieved in a particularly simple manner by using a casting or injection molding process.

In particular, the insulation shell can be molded onto the primary packaging. This is particularly advantageous when the primary packaging is designed as an ampoule or vial. The insulation shell is then applied by using the ampoule or vial as a carrier for the injection molding process, i.e. the latent heat storage material is sprayed directly onto the primary packaging or the primary packaging is encased with latent heat storage material.

The use of a dimensionally stable latent heat storage material offers the further advantage that the insulation shell can serve as additional protection for the primary packaging against mechanical impact. Depending on the rigidity, the latent heat storage material can also be used as a shock absorber and protect the primary packaging, which is made of glass, for example, if the packaging falls to the floor, for example. The rigidity of the latent heat storage material can be optimally adapted to the product, since dimensionally stable latent heat storage materials with a high modulus of elasticity of up to 3000 $N/mm^2$ or with a very low modulus of elasticity of up to 1 $N/mm^2$ can be produced. In the variant in which a phase change material is poured in liquid form into a plastic shell, the additional mechanical protection can take place via the rigidity of the plastic shell.

The insulation shell can preferably consist of at least two layers, which particularly preferably have phase change materials with different phase transition temperatures. This allows the desired temperature range to be set easily and efficiently.

The insulation shell can be formed from two half parts or from a plurality of parts which together enclose the primary packaging.

The insulation gap is preferably delimited on the outside by the cardboard box and on the inside by the insulation shell. In order to obtain particularly good thermal insulation of the pharmaceutical product, it is preferably provided that the insulation gap is filled with a gas, such as, for example, with air, $CO_2$, krypton, xenon or a mixture of these gases, or is evacuated.

The insulation gap preferably has a thickness of <16 mm, in particular 5-10 mm. With a 10 mm thick insulation gap, the heat conduction of the air in the gap is approx. 2.6 $W/m^2K$. As measurements have shown, the heat transfer coefficient at the interface between the outer packaging and the air in the insulation gap or between the insulation shell and the air in the insulation gap is approx. 3-5 $W/m^2K$. With a gap width of less than 5 mm, the relevant insulating effect, due to the two heat transfer coefficients of the surfaces adjacent to the air gap, is no longer created via the air. The insulation gap can preferably also have a thickness of <5 mm, in particular 1-3 mm.

The insulating performance of the insulation gap can be further improved by coating the two surfaces delimiting the gap, or even just one of the surfaces, with a heat-reflective coating.

A preferred embodiment therefore provides that the insulation shell has a heat-reflecting coating, such as a metallic coating or a metal foil, on its outside.

Alternatively or additionally it can be provided that the cardboard box has a heat-reflecting coating on its inner surface, such as a metallic coating or a metal foil.

Preferably, the heat-reflecting coating is formed of a metallic, in particular gas-tight coating, preferably a coating with an emissivity of <0.5, preferably <0.2, particularly preferred <0.04, such as a coating made of aluminum.

The coating allows the energy transfer due to thermal radiation to be significantly reduced and the insulation performance is increased without a significant increase in costs.

The insulation performance can be further increased by filling the insulation gap with additional layers of reflective foils, or by removing the gas from the insulation gap (vacuum). Alternatively, the insulation gap can be filled with a highly insulating material such as an airgel.

In order to further improve the insulating effect of an insulation gap filled with a gas, it is preferably provided that the insulation gap is subdivided by at least one intermediate layer, preferably a film, arranged in the insulation gap. The at least one intermediate layer is preferably arranged essentially parallel to the outer and inner surfaces delimiting the insulation gap. If the thickness of the insulation gap is too great, undesirable convection can take place within the insulation layer. In order to prevent this, the at least one intermediate layer divides the insulation gap into at least two areas, each with a smaller thickness. The intermediate layer can preferably be provided with heat-reflecting properties on one or both sides, in particular with a heat-reflecting coating. The heat-reflecting coating is preferably formed of a metallic, in particular gas-tight coating, preferably a coating with an emissivity of <0.5, preferably <0.2, particularly preferred <0.04, such as a coating made of aluminum.

At least one layer, in particular several superimposed layers, of a heat-reflecting film, in particular metal foil, is particularly preferably arranged in the insulation gap.

According to a preferred embodiment, the insulation gap is created by arranging spacer elements, in order to keep the insulation shell in the secondary packaging at a distance from the secondary packaging on all sides.

The spacer elements can be made up of separate parts that are distributed around the insulation shell and are arranged between the insulation shell and the secondary packaging, the contact surfaces of the spacer elements on the insulation shell and the cardboard box being minimized in order to reduce the transfer of heat through conduction.

The spacer elements preferably consist of the phase change material of the insulation shell or are formed from cardboard elements, in particular cardboard elements of the secondary packaging.

In order to be able to monitor compliance with the prescribed temperature range and/or to be able to detect inadmissible opening of the secondary or primary packaging for the purpose of introducing a counterfeit, a preferred development provides that a temperature sensor or a temperature control strip is arranged in the insulation gap, in the latent heat storage material, between latent heat storage material and primary packaging or in the primary packaging. Temperature control strips are a type of chemical paper thermometer in which a measuring strip changes its color irreversibly when it reaches a predetermined temperature.

Furthermore, in this context, an electronic memory can be provided in the packaging for storing temperature measurement values recorded at regular intervals or continuously, the electronic memory preferably being connected to an electronic circuit for wirelessly reading out the stored temperature measurement values. For example, the stored temperature measurement values can be fed to an antenna for wireless inductive transmission of the values to a reading device. The data can be transmitted using the RFID or NFC standard, for example.

The temperature sensor is preferably arranged between the primary packaging and the secondary packaging or within the insulation shell. In the case of the arrangement within the insulation shell, the temperature measurement can be used to determine whether it has been opened. Without opening the insulation shell, there cannot be a sudden rise in temperature. When the insulation shell is opened, there is inevitably a jump in temperature, since the outside temperature cannot be adjusted to, for example, 0.1K of the inside temperature before opening, as the inside temperature is not known to a third party. It can thus be ensured that an exchange of the pharmaceutical product is automatically recognized by a system.

The invention is explained in more detail below with reference to exemplary embodiments shown schematically in the drawing.

Figure 1:
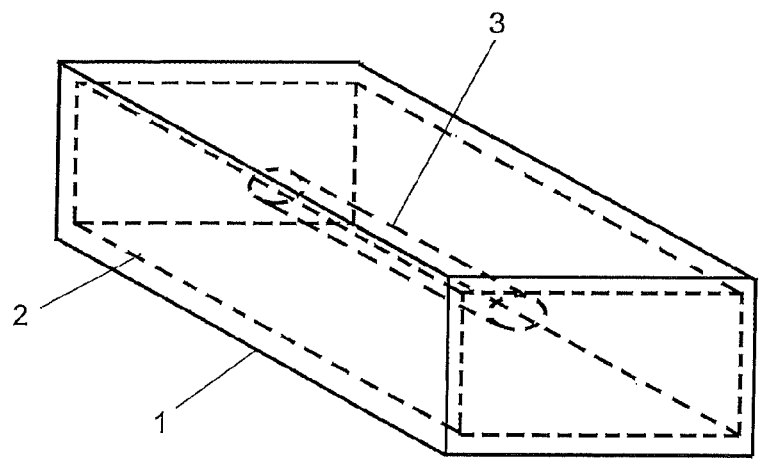
FIG. 1 shows a perspective view of the packaging according to the invention.
Figure 2:
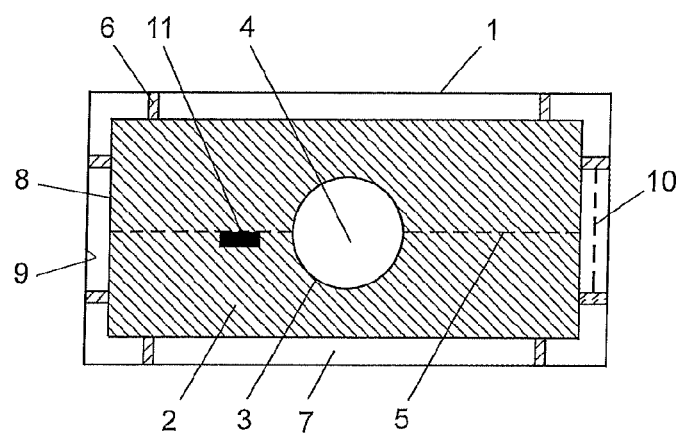
FIG. 2 shows a cross section of the packaging according to FIG. 1.

In FIGS. 1 and 2, a cardboard box is denoted by 1, which represents the secondary packaging. In the interior of the cardboard box 1, an insulation shell 2 is arranged, which consists of a latent heat storage material or contains such a material. The insulation shell encloses a primary packaging 3, which is designed, for example, as a glass ampoule, which holds a pharmaceutical product in its interior 4. The insulation shell 2 can consist, for example, of two half-shells which can be separated from one another along a separation plane 5 in order to make the primary packaging 3 accessible. As can be seen in FIG. 2, the insulation shell is adapted to the outer shape of the primary packaging 3, so that the insulation shell 2 rests flat against the primary packaging 3, in the present case along a cylindrical surface.

Between the insulation shell 2 and the cardboard box 1, spacer elements 6 are arranged on all sides, i.e. on all six sides of the cuboid, which ensures that an insulation gap 7 is provided between the insulation shell 2 and the cardboard box 1. The insulation gap 7 is filled with a gas, such as air. To improve the thermal insulation, a heat-reflecting coating 8 or 9, for example in the form of a metal foil, can be applied to the outside of the insulation shell 2 and/or to the inside of the cardboard box 1. A heat-reflecting planar element, for example a metal foil, can also be arranged in the insulation gap 7, as is indicated by way of example with the dashed line 10 in the area between the two right-hand spacer elements 6.

To control the temperature of the pharmaceutical product, a temperature sensor 11 is also provided, which is directed towards the separation plane 5 if the insulation shell 2 is formed from two half-shells. The temperature sensor 11 can not only monitor the temperature of the pharmaceutical product, but also detect an unauthorized opening of the packaging. If the two half-shells of the insulation shell are separated from one another, the temperature detected by the temperature sensor 11 changes suddenly.

The invention claimed is:

1. A packaging for pharmaceutical products, comprising a primary packaging for receiving a dose or several doses of a pharmaceutical product, and a secondary packaging designed as a cardboard box in which the primary packaging is received, wherein the primary packaging is arranged in an insulation shell having a latent heat storage material and the insulation shell is held in the secondary packaging at a distance on all sides from the secondary packaging to form an insulation gap, wherein the latent heat storage material contains a phase change material, and wherein the latent heat storage material comprises a carrier material which is dimensionally stable at a use temperature, in which the phase change material is distributed within a solidified mass of the carrier material so that the latent heat storage material is dimensionally stable in a temperature range both below and above a melting point of the phase change material.

2. The packaging according to claim 1, wherein the insulation shell surrounds the primary packaging on all sides.

3. The packaging according to claim 1, wherein the primary packaging is designed as a blister pack, ampoule, injection ampoule or vial.

4. The packaging according to claim 1, wherein the phase change material is selected from the group consisting of: paraffin, esters, linear alcohols, ethers, organic anhydrides, salt hydrates, water-salt mixtures, salt solutions and water-based solutions, or mixtures thereof.

5. The packaging according to claim 1, wherein the phase change material has a phase transition temperature of 3-10° C.

6. The packaging according to claim 1, wherein the phase change material is present in a dimensionally stable enclosure or a plastic enclosure.

7. The packaging according to claim 1, wherein the latent heat storage material is dimensionally stable up to a temperature of at least 5° C. above a phase transition temperature of the phase change material.

8. The packaging according to claim 1, wherein the insulation shell is produced by injection molding the latent heat storage material.

9. The packaging according to claim 1, wherein the insulation shell is adapted in shape to the primary packaging and lies flat against said primary packaging on all sides.

10. The packaging according to claim 1, wherein the insulation shell is molded onto the primary packaging.

11. The packaging according to claim 1, wherein the insulation shell has a modulus of elasticity of 1 to 3,000 N/mm$^2$.

12. The packaging according to claim 1, wherein the insulation shell has a heat-reflecting coating, a metallic coating or a metal foil, on an outside thereof.

13. The packaging according to claim 12, wherein the heat-reflecting coating is formed of a metallic, gas-tight coating with an emissivity of <0.5.

14. The packaging according to claim 1, wherein the cardboard box has a heat-reflecting coating, a metallic coating or a metal foil, on an inner surface thereof.

15. The packaging according to claim 1, wherein the insulation gap is filled with a gas or is evacuated.

16. The packaging according to claim 1, wherein at least one layer of a heat-reflecting film is arranged in the insulation gap.

17. The packaging according to claim 1, wherein the insulation gap has a thickness of <16 mm.

18. The packaging according to claim 1, wherein spacer elements are arranged in order to hold the insulation shell in the secondary packaging at a distance on all sides from the secondary packaging.

19. The packaging according to claim 18, wherein the spacer elements consist of the phase change material of the insulation shell or are formed from cardboard elements.

20. The packaging according to claim 1, wherein a temperature sensor or a temperature control strip is arranged in the insulation gap, in the latent heat storage material, between the latent heat storage material and the primary packaging or in the primary packaging.

21. A packaging for pharmaceutical products, comprising a secondary packaging designed as a cardboard box adapted to receive a primary packaging for receiving one dose or several doses of a pharmaceutical product, wherein the cardboard box contains an insulation shell having a latent heat storage material which encloses an interior space adapted to receive the primary packaging, wherein the latent heat storage material contains a phase change material, wherein the latent heat storage material comprises a carrier material which is dimensionally stable at a use temperature, in which the phase change material is distributed within a solidified mass of the carrier material so that the latent heat storage material is dimensionally stable in a temperature range both below and above a melting point of the phase change material and that the insulation shell is held in the cardboard box at a distance from the cardboard box on all sides to form an insulation gap.

* * * * *